United States Patent [19]

Jensen et al.

[11] Patent Number: 5,504,981
[45] Date of Patent: Apr. 9, 1996

[54] BENT BLADE AND SPACER TIRE RASP HUB ASSEMBLY

[75] Inventors: Wayne Jensen, Olympia Fields; Charles K. Stanfield, Crete, both of Ill.

[73] Assignee: B & J Manufacturing Company, Glenwood, Ill.

[21] Appl. No.: 109,626

[22] Filed: Aug. 20, 1993

[51] Int. Cl.[6] .................................................... B23D 71/00
[52] U.S. Cl. ............................................. 407/29.13; 407/61
[58] Field of Search .......................... 29/78, 79; 407/61, 407/62, 63

[56] References Cited

U.S. PATENT DOCUMENTS

| | | | |
|---|---|---|---|
| 2,703,446 | 3/1955 | Jensen | 29/79 |
| 3,074,148 | 1/1963 | Hemmeter | 29/79 |
| 3,747,177 | 7/1973 | Jensen | 29/78 |
| 4,019,234 | 4/1977 | Jensen et al. | 29/79 |
| 4,336,640 | 6/1982 | Willinger | 29/79 |
| 4,529,338 | 7/1985 | Erkfritz | 407/61 |
| 5,033,175 | 7/1991 | Jensen | 29/78 |

*Primary Examiner*—Maurina T. Rachuba
*Attorney, Agent, or Firm*—Niro, Scavone, Haller & Niro

[57] ABSTRACT

A rasp hub assembly for use in a tire buffing machine is disclosed. The hub assembly includes two end plates, and a set of tire rasp blades and spacers arranged in alternating circumferential rows. The blades and spacers have conforming nonplanar elongated bodies, with the blades nested with adjacent spacers. The resulting rasp hub assembly allows the use of an even or odd number of rasp blades in each row, and provides various benefits further described in the specification.

19 Claims, 3 Drawing Sheets

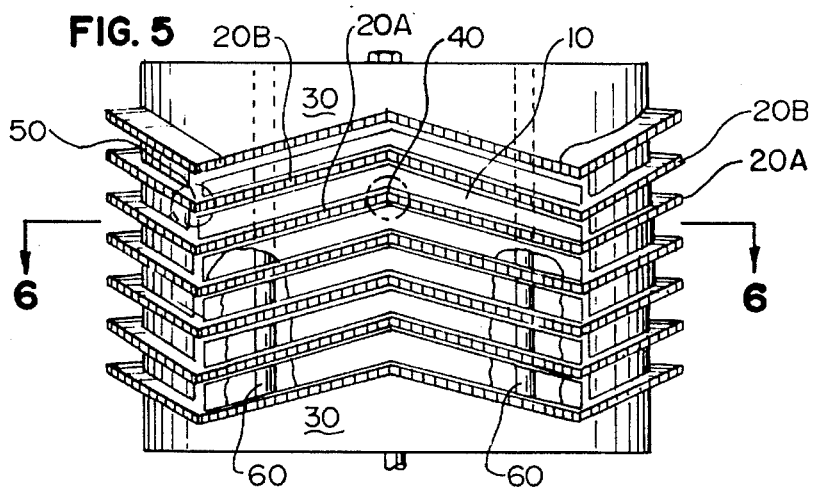
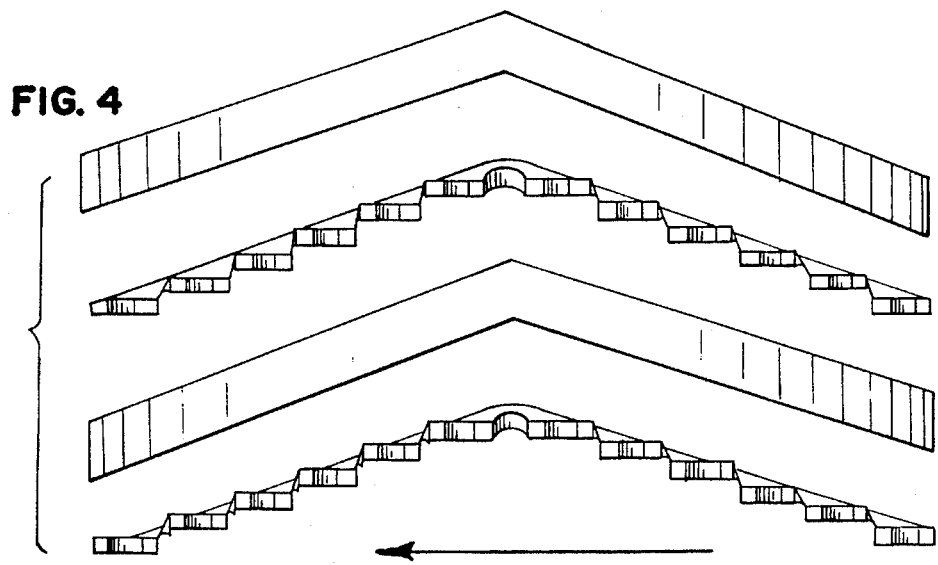
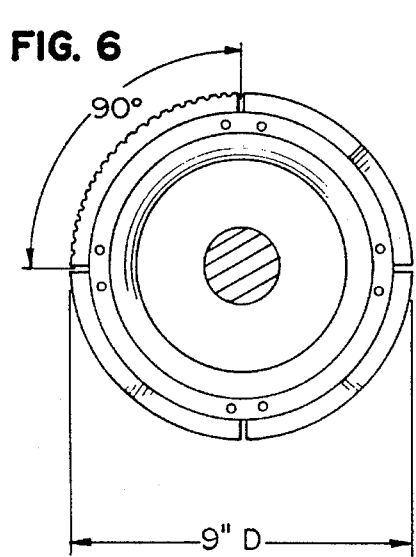
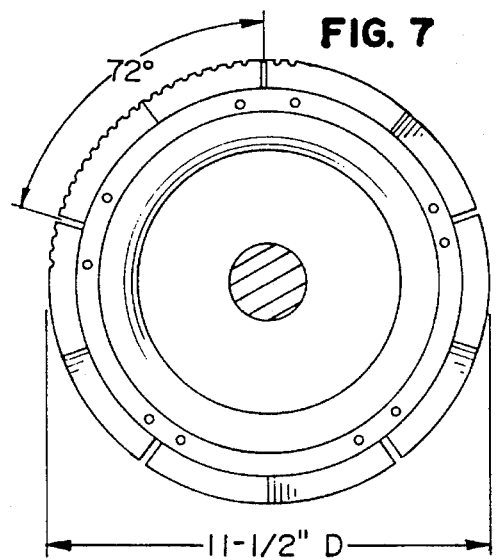

BENT BLADE AND SPACER TIRE RASP HUB ASSEMBLY

BACKGROUND OF THE INVENTION

The present invention relates to a new tire rasp hub assembly for use in tire buffing machines. More particularly, it relates to a novel tire rasp hub assembly which incorporates nonplanar or "bent" spacers with nonplanar or "bent" rasp blades.

The disclosures of U.S. Pat. Nos. 5,033,175, 4,019,234 and 2,703,446 are incorporated herein by reference into this application.

Tire buffing machines are well known in the tire retreading industry. Conventionally, a tire buffing machine includes both a structure for mounting a used tire and a rasp hub which removes the worn tread from the used tire prior to the retreading process. The used tire is rotated while it is held against the rapidly rotating rasp hub whose outside perimeter is provided with a multitude of tire rasp blades. When so engaged against the used tire, the rasp blades cut or shear small segments of rubber from the worn tread surface area of the tire. In this way, the tire is "buffed" to remove the unwanted used tread and to achieve an evenly textured surface suitable for retreading.

Tire rasp blades, together with intervening spacers, are assembled on the periphery of the rasp hub between the hub front and back plates. U.S. Pat. Nos. 2,703,446 and 4,019, 234 disclose such conventional prior art rasp hub assemblies wherein the back plate of the hub has axially directed support pins for mounting the rasp blades and spacers. The front plate is then placed on the support pins against the assembled blades and spacers and locked into place.

Use of bent tire rasp blades with flat spacers is described in U.S. Pat. No. 5,033,175. This arrangement creates a circumferentially interlocked hub with less potential for mechanical failure at high rotational speeds. The tire buffing machine hub assembly disclosed in U.S. Pat. No. 5,033,175 has proven generally satisfactory. However, in this assembly two separate planar spacers are associated with and overlap each rasp blade. A one-for-one correspondence and positioning of spacers and blades, together with a spacer configuration which facilitates the proper location of the blades, would allow the hub assembly to be assembled more quickly and easily. Additionally, conventional rasp hub assemblies (as shown, for example, in FIG. 9), do not allow the use of an odd number of the bent blades disclosed in U.S. Pat. No. 5,033,175 with a conventional hub, since conventional hubs employ only an even number of alternate angled surfaces or sections and each such blade covers two angled surfaces.

Finally, there is a continuing need to improve tire rasp performance while maintaining or reducing power requirements. Thus, designers recognize that a superior rasp hub assembly would provide enhanced control, superior cutting, durability and buffing action, a safe, stable hub assembly, and an economical hub design which can be assembled and maintained by lesser skilled workers. The present invention accomplishes each of these goals.

SUMMARY OF THE INVENTION

The present invention is directed to a novel tire rasp hub assembly having elements whose shape and configuration result in ease of assembly and use, long life, and enhanced buffing performance without any significant increase in power requirements. As a result, a substantially enhanced tire buffing process is achieved.

In accordance with the present invention, a rasp hub assembly for use in a tire buffing machine is provided. The rasp hub assembly includes two end plates, and a set of tire rasp blades arranged in a separate plurality of circumferential rows. Each of the blades has a body made up of two planar portions ("flats") and an outer arcuate working edge. The working edges of the rasp blades thereby define a generally cylindrical tire buffing surface. A set of spacers is also provided, and arranged in a plurality of circumferential rows. Each of the spacers has an outer edge recessed from the tire buffing surface. The blades and spacers are disposed in alternating rows between the end plates, and have conforming nonplanar elongated bodies. The nonplanar blades of each row are nestably juxtaposed with the nonplanar spacers in adjacent rows.

In a preferred embodiment, blades within the same row are positioned in end-to-end relation immediately adjacent each other, with no intervening spaces between the blades. Moreover, with respect to the cylindrical hub axis, each end of each blade within any given row lies on a common axial plane. In a particularly preferred embodiment, the blade flats are joined by a nonplanar intermediate portion, which may either be angled or curved.

In the context of the present invention, the terms "nonplanar", "bent" and "V-shaped" are all intended to describe the geometry of rasp blades and spacers once they have been assembled within the hub assembly, and then viewed radially toward the hub's axis of rotation from a point outside the circumference of the hub. Thus, a "nonplanar" blade body is one whose length, from end to end, does not lie in a single plane. While, a "nonplanar" blade body may also include a rasp blade whose "working edge" includes teeth that are angularly set or laterally displaced, "blade body" as defined here does not include the teeth. Further, the term "axial" as used herein is defined in reference to the axis of the cylindrical hub assembly (i.e., in a direction along the longitudinal surface of the cylinder formed by the hub). Thus, the "axial plane" of the hub is a plane passing through the hub which is normal to the longitudinal axis of the hub.

"Symmetrical" as used to describe blades and spacers in the present invention is intended to mean a type of blade or spacer configuration in which a repetitive pattern is utilized, such that one half of the blade or spacer is a mirror image of the other half. However, while the preferred embodiment of the present invention includes the use of symmetrical blades with generally correspondingly shaped symmetrical spacers, the present invention also contemplates that the spacers and blades may be nonplanar and asymmetrical.

In a particularly preferred embodiment of the present invention, the rasp hub has two end plates with angled surfaces. A number of nonplanar symmetrical blades and an equal number of nonplanar symmetrical spacers are also employed, with the number of blades and spacers in each longitudinal circumferential row equalling half the number of angled surfaces on each end plate. The blades and spacers are preferably V-shaped. In an additional embodiment of the invention, non-symmetrical blades and spacers may be used, as is further discussed below.

The use of nonplanar blades and nonplanar spacers in the present invention thus allows the use of either an even or an odd number of blades in each longitudinal circumferential row within the rasp hub assembly. Thus, the use of nonplanar blades and spacers in accordance with the present invention affords greater flexibility to the tire rasp hub designer, permitting three, four, five or any odd or even number of blades for a given application.

The present invention allows the use of elongated apertures in the blades and spacers for accommodating the hub pins. An "elongated aperture" as used herein is defined as a hole whose length along the longitudinal axis of the blade body is greater than its width. With prior art blades, circular holes have been typically used to facilitate proper location of the blades in the rasp hub assembly. However, due to the decreased tolerance encountered with circular holes as opposed to elongated apertures, blades will sometimes stick as they are canted in placement. It has been found that the use of elongated apertures with each of the blades of the present invention helps prevent this undesirable locking effect.

Additionally, the use of V-shaped spacers and V-shaped blades allows the assembler to properly locate the position of the blade simply by fitting the blade over a conforming V-shaped spacer. These features facilitate a quick and easy assembly of blades in the hub assembly which is an additional improvement over the prior art. This is true to an even greater extent when elongated apertures are used as blade mounting holes.

Other attendant advantages flow from the unique blade/spacer configuration of the present invention. For instance, since the number of angled surfaces employed by the blades is increased, a proportional increase in the number of sweeps performed in one revolution of the hub assembly occurs. A "sweep" is defined as the travel of the effective engagement point of the working edge for any given blade in one axial direction as the blade rotates on the circumference of the hub. Because the rasp blades of the present invention are bent, in one pass over the tire the effective engagement point will travel first in one axial direction and then in the other. This alternating travel allows a more aggressive sweeping action despite the maintenance of a constant rotational speed for the rotary rasp hub assembly. Effectively, the present invention provides at least double the sweeping action of that achieved by blades in conventional rasp hub assemblies.

Another important attendant advantage of the novel blade/spacer configuration of the present invention is an increase in the number of sweeps-per-revolution, while maintaining the same number of rasp blades and hub pins. Thus, for example, conventional prior art 9-inch hub assemblies have four blades to a row, and eight pins in the hub. Conventional knowledge would require eight separate blades per row and sixteen pins to double the sweep action. Thus, the sweep-to-pin ratio for a conventional 9-inch hub is 0.5, whereas the sweep-to-pin ratio for a 9-inch hub of the present invention is 1. A 100% increase in the sweep-to-pin ratio is therefore realized. This increase in the sweeps-per-revolution, without a corresponding increase in the number of pins necessary to retain the blades in position, further facilitates the prompt assembly of a more sophisticated hub, and also decreases manufacturing costs, given the added benefits.

Again, by way of example, conventional prior art 11.5-inch hubs may have five blades and ten pins. Again, conventional teaching would suggest that, in order to achieve ten flats, ten blades, and thus twenty pins would be required. Again, the sweep-to-pin ratio for conventional 11.5-inch hubs is 0.5, whereas the sweep-to-pin ratio for an 11.5-inch hub of the present invention is 1.

To ensure proper performance and decreased vibration during the high rotational speeds achieved (about 2000–5000 rpm), rasp hub assemblies are typically balanced, in a manner akin to wheel balancing. An additional benefit of the relative paucity of components required by the design of the present invention is that balancing is more easily accomplished, thus further facilitating the manufacture of the rasp hub assembly of the present invention. Additionally, the pin holes on the blades of the present invention are preferably located at the midpoint of the blade flats, as shown in FIG. 1. This preferred feature also serves to favorably distribute the weight of the blades on the rasp hub assembly.

It has also been determined that the present invention gives the operator better control and stability during cutting while also imparting an enhanced sharpening action to the blade and an enhanced buffing action to the tire. Three reasons are believed responsible for the enhanced stability and concomitant advantages which result from the novel bent blade/spacer arrangement of the present invention.

First, the spacers of the present invention are thought to uniquely stabilize the hub assembly by carrying a portion of the forces imparted to the blades during buffing. Since each bent blade extends axially along the hub assembly over some distance and nests between two adjacent bent spacers, the spacers overlie and anchor the blades in a manner not previously achieved. Due to this unique assembly, the spacers are thought to more effectively bear at least a portion of the different centrifugal and impact loads imparted to the teeth during buffing. The present invention thus enables the assembly of a more stable hub. The rotation of a more stable hub, in turn, provides that a more even distribution of force is imparted to each tooth on each blade, lengthening overall blade life and durability.

Second, it is also thought that the symmetrical blade configuration of the present invention contributes to the overall stability of the hub assembly as well. A force is exerted by the tire onto the first planar portion of the blade as acts on the tire. Then, as the second planar portion of the blade sweeps through the tire, an equal and opposite force is exerted by the tire on that portion. It is thought that these alternating, counteracting resistive forces act on the rotating hub assembly to further stabilize the hub.

Finally, because the number of sweeps is increased for a given hub diameter, the duration of the force in one direction is believed to decrease substantially from that in conventional hubs. This decreased duration combines with the stabilizing effects, mentioned above, to also tend to stabilize the hub.

As previously mentioned, the nonplanar rasp blades of the present invention can accommodate angularly set teeth. In the context of the present invention the term "angularly set" is intended to refer to a tooth that has been bent or formed at its base such that the leading edge and trailing edge of the same tooth are on alternate sides of the centerline of the blade body, though the middle point of the tooth's free end remains on the centerline of the blade body. In a preferred embodiment, each of the two planar portions of the rasp blade includes angularly set teeth. The teeth are sloped in a direction generally opposite to the slope of the individual planar portion, as shown in FIG. 4.

It should be noted that the corresponding symmetry between the blades and spacers, as well as the mirror-image symmetry of each of the blades and spacers, allows the hub assembly to be rotatably reversible (that is, equally capable of cutting and buffing in either direction), thus retaining a feature found in prior art rasp hub assemblies.

Accordingly, it is one object of the present invention to provide a novel tire rasp hub assembly for use on a tire buffing machine which allows the use of a sophisticated blade design that would otherwise require higher manufacturing costs and more skill in operation, but which can now be provided more economically, and which can be operated and maintained by lesser skilled operators.

It is another object of the present invention to employ a novel tire rasp hub assembly which combines the use of symmetrical, nonplanar blades and symmetrical nonplanar spacers, and provides a more aggressive cutting action, and an enhanced buffing action, as compared to conventional rasp hub assemblies which are operated at identical rotational speeds.

It is yet another object of the present invention to provide an improved hub assembly with an increased number of angled surfaces which will allow greater versatility in the design of the hub so as to enable either the use of an odd or an even number of blades in each longitudinal circumferential row.

It is a further object of the present invention to provide an improved rasp hub assembly which enables better control and greater stability while imparting an enhanced buffing action to the tire surface.

BRIEF DESCRIPTION OF THE DRAWINGS

The novel features which are characteristic of the present invention are set forth in the appended claims. The invention itself, however, together with further objects and attendant advantages, will be best understood by reference to the following description taken in connection with the accompanying drawings in which:

FIG. 4 is an enlarged view of two bent spacers, together with two intervening bent blades. The direction of hub rotation is shown by the accompanying arrow.

FIG. 5 is a side view of a particularly preferred embodiment of the rasp hub assembly of the present invention, including two end plates, together with bent blades and spacers nestably juxtaposed between the spacers.

FIG. 6 is a cross-sectional view of a 4-blade rasp hub assembly of the present invention. ("4-blade" is intended to mean that four separate bent blades are used in each longitudinal circumferential row.)

FIG. 7 is a cross-sectional view of a 5-blade rasp hub assembly of the present invention.

DETAILED DESCRIPTION OF THE PREFERRED EMBODIMENTS

Figure 1:
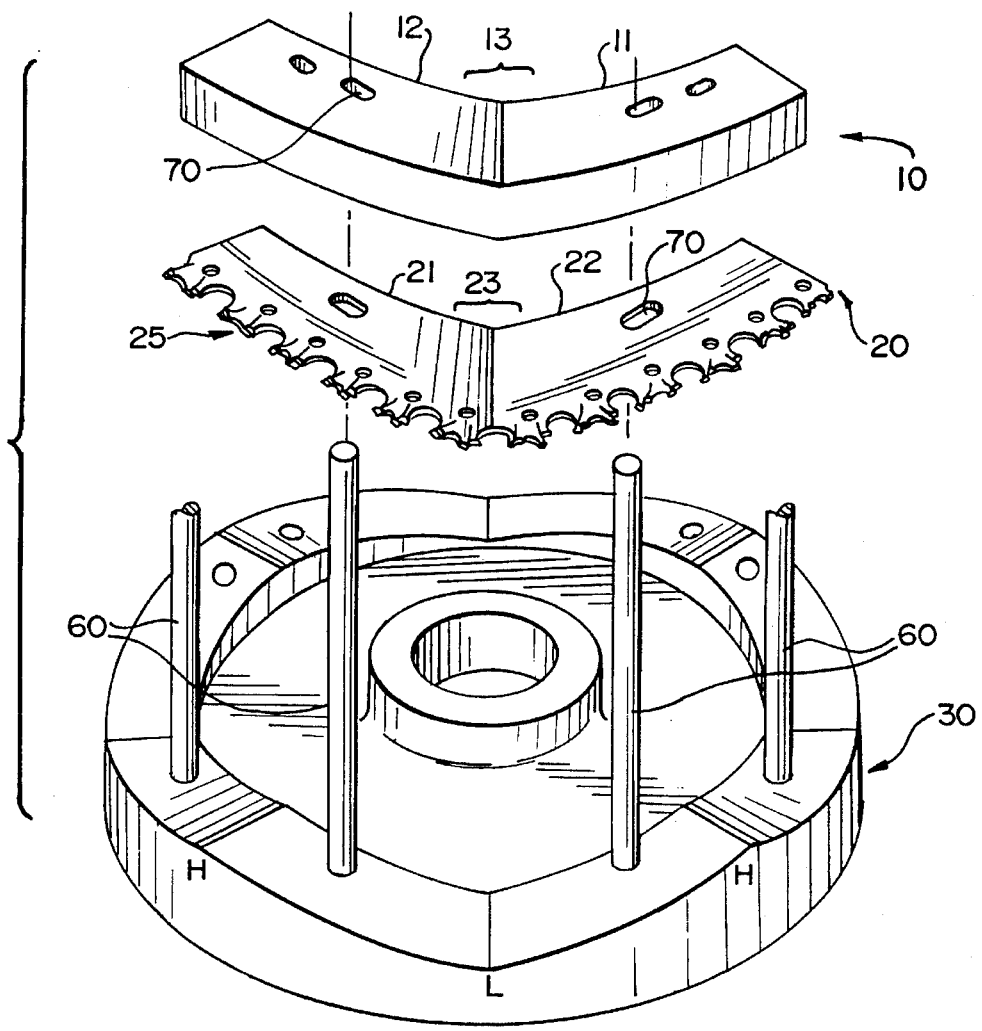
FIG. 1 is a perspective view of a hub end plate of the present invention which includes eight angled surfaces and eight hub pins (only four are shown), as well as a bent blade and bent spacer according to the present invention for assembly to two of the pins and the end plate.
Figure 2:
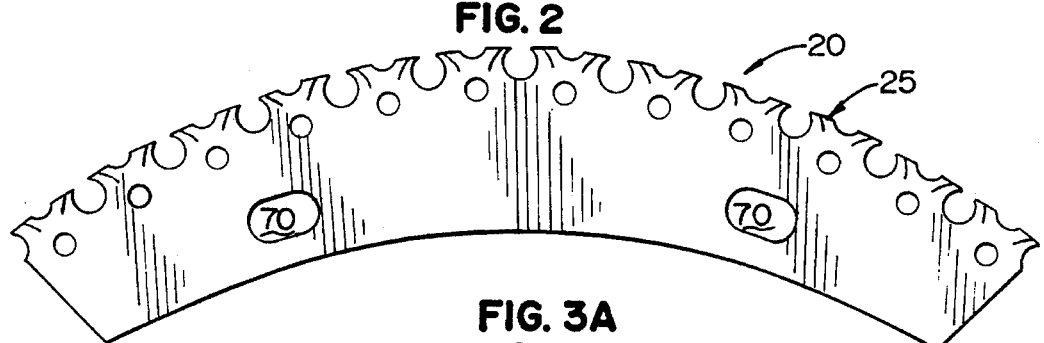
FIG. 2 is a side elevational view illustrating a bent tire rasp blade made in accordance with one embodiment of the present invention.

With reference to FIGS. 1–3, a rasp hub end plate of the present invention is designated generally as 30, and is intended to be assembled via pins 60 to a nonplanar or "bent" rasp blade, designated generally as 20, and a bent spacer, designated generally as 10. Spacer 10 has planar portions or "flats" 11 and 12, which intersect at an intermediate angled portion 13. Blade 20 has an outer arcuate working edge 25, and a body having two planar end portions 21 and 22, which intersect at intermediate angled portion 23. While intermediate angled portion 23 may be curved, in the preferred embodiment end portions 21 and 22 intersect in a vertex. Blade 20 and spacer 10 are also provided with elongated apertures 70, with one such aperture occupying each flat.

Figure 9:
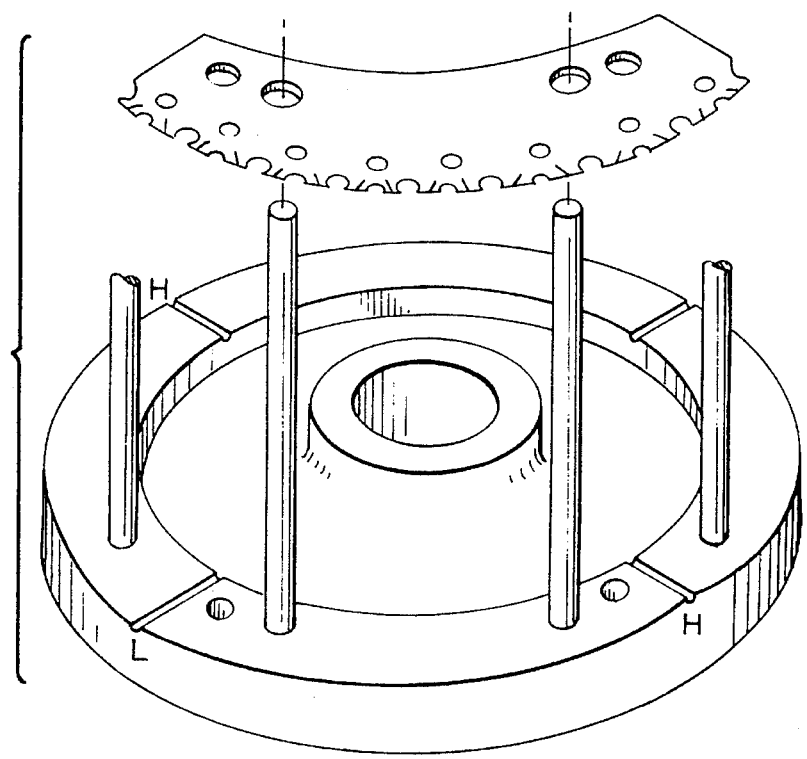
FIG. 9 is a perspective view of a conventional, prior art rasp hub end plate with four planar sections, together with a conventional planar blade.

FIG. 9 shows a conventional, prior art hub end plate whose outer periphery has four planar sections, and a conventional planar rasp blade. These four sections include two low points (designated "L") and two raised or high points (designated "H"). In contrast, one embodiment of the present invention includes a hub end plate, shown in FIG. 1, which has eight planar sections with four high points and four low points. Preferably, the height dimension between high and low spots is greater than the spacer width associated with a particular hub. Alternatively, with the present invention the sweep distance of a blade is greater than the width of the spacers. In order to retain this preferred height differential, the angle each planar section of the end plate makes with the axial plane of the hub must be increased, as compared to conventional prior art rasp hubs.

Referring now to FIG. 5, each bent blade 20 is shown nestably juxtaposed or nestably positioned face-to-face between two adjacent bent spacers 10. Preferably, the adjacent blades in each longitudinal circumferential row are positioned in end-to-end relation (i.e., there is little or no spacing between adjacent blade tips). As can be seen, the topmost or intermediate portion 40 (shown circled) of an adjacent lower blade 20A is at about the same level, or in approximately the same axial plane, as the lowermost portion 50 (shown circled) of an adjacent upper blade 20B. This configuration enables the blades to completely sweep through the entire area of that portion of the tire to be buffed.

FIGS. 6 and 7 illustrate two preferred embodiments of the present invention, in which 9-inch and 11.5-inch hub diameters are used, respectively. The FIG. 6 embodiment incorporates four bent blades (and therefore the corresponding hub end plates each have eight angled surfaces, as shown in the end plate of FIG. 1), while the FIG. 7 embodiment incorporates five bent blades (and therefore the corresponding hub end plates each have ten angled surfaces).

Figure 3A:
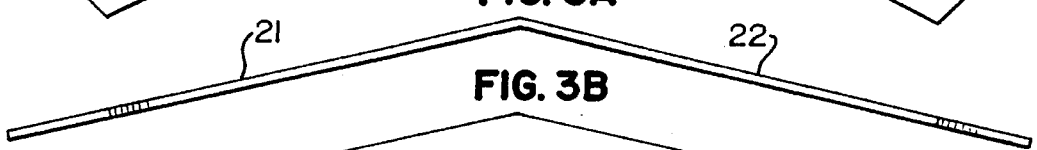
FIG. 3A is a bottom view of the bent tire rasp blade illustrated in FIG. 2.
Figure 3B:
FIG. 3B is a bottom view of the bent spacer of the present invention.
Figure 8A:
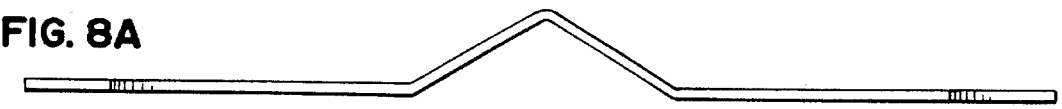
FIGS. 8A through 8D are each bottom views illustrating alternative configurations for tire rasp blades and spacers which are contemplated by the present invention.
Figure 8B:
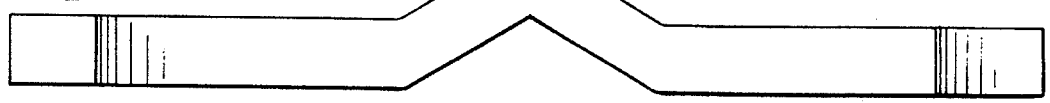
Figure 8C:
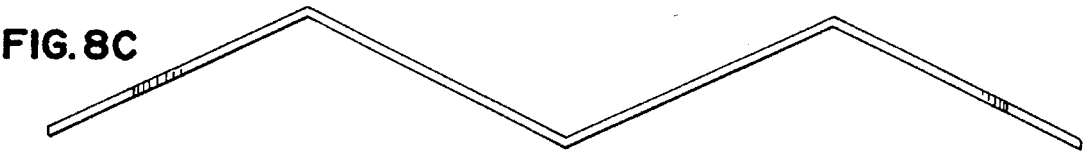
Figure 8D:
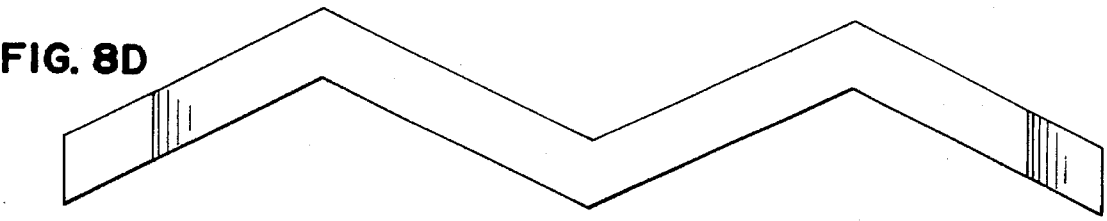

While the blade and spacer embodiments of FIGS. 3A and 3B constitute the particularly preferred embodiment of the present invention, FIGS. 8A through 8D illustrate two alternative embodiments for the blades and spacers of the present invention. These embodiments are not intended to be a limitation on the possible blade and spacer geometries within the purview of the present invention. Additionally, the present invention contemplates the use of both rigid, pre-formed blades and conformable, resilient blades. Other blades and spacers, such as hinged blades or spacers, are contemplated as well. As rasp blade manufacturers explore the use of different materials, as well the possibilities of hybrid blades (i.e., combinations of metallic and nonmetallic materials), and hybrid manufacturing techniques (i.e., induction-hardening only portions of the blade), it is thought additional configurations may be used.

It will be recognized that as blade and spacer configurations increase in complexity, the topography of the hub end plate sections adjacent the blades must change in conformance. Other nonplanar or curved shapes for the blades or spacers are contemplated, and made possible by the present invention. It is generally intended however, though not required, that the shape of the spacers should generally correspond to the shape of the blades.

It is the unique combination of symmetrical, nonplanar blades and symmetrical, nonplanar spacers, together with hub end plates whose inner surfaces are angled or curved to conform to the particular spatial configuration of blades and spacers utilized, which is the particularly preferred embodiment of the present invention. It is from this combination that the attendant advantages to the present invention accrue.

In the particularly preferred configuration of the blades and spacers, shown in FIGS. 3A and 3B, respectively, the angle defined by the blade flat of a particular blade and the axial plane of the hub is approximately 8°. As the flat length for an identical number of blades and spacers used in each longitudinal circumferential row increases, this same angle decreases. However, the angle is preferably chosen to provide a broad sweeping action of the blades across the entire surface of the tire to be retreaded, as described above. Preferably, this choice of angle is combined with a rasp hub assembly in which no more than one pin is associated with each blade flat and each spacer flat.

It will be understood that one of the features of the present invention is that it allows the designer to adjust the buffing action by incrementally increasing the number of blades used in each longitudinal circumferential row. In the preferred embodiment, as the number of blades increases for a given hub circumference, the angle defined by the flat of a particular blade and the axial plane of the hub increases. Additionally, unlike prior art blades, in which the addition of each blade flat in a circumferential row requires a corresponding increase of two extra hub pins, each additional blade flat in the present invention only requires one more pin. This feature gives the designer added flexibility, since a more sophisticated design can be achieved without proportionate increases in manufacturing and assembly costs.

It will be appreciated by those skilled in the art that various modifications and changes can be made to the illustrated embodiments without departing from the spirit of the present invention. All such modifications and changes are intended to be covered by the appended claims.

We claim:

1. A rasp hub assembly for use in a tire buffing machine, comprising:

two end plates having inner nonplanar surfaces;

a set of tire rasp blades arranged in a plurality of first circumferential rows, each of said first rows comprising a plurality of said blades and each of said blades having an outer arcuate working edge such that the working edges of said set of tire rasp blades thereby define a generally cylindrical tire buffing surface;

a set of spacers arranged in a plurality of second circumferential rows, each of said second rows comprising a plurality of said spacers and each of said spacers having an outer edge recessed from said buffing surface;

said blades and spacers being disposed in alternating first and second rows between said end plates; and said blades and spacers having conforming, nonplanar elongated bodies, each of the bodies of the blades and the spacers having opposing symmetrical, nonplanar surfaces and including at least two planar flats such that said blades of one row are nestably juxtaposed with said spacers in adjacent rows, thereby increasing overall hub stability and facilitating positioning of the blades during assembly.

2. The rasp hub assembly of claim 1, further comprising:

a plurality of pins extending between the end plates and through apertures in the blades and the spacers, said spacers and blades each including at least two flats, and wherein each of the flats of said blades cooperates with no more than one of said pins.

3. The rasp hub assembly of claim 2, wherein each of said blades includes at least two apertures for accommodating said pins, each said aperture being located at the midpoint of said blade flat.

4. The rasp hub assembly of claim 3, wherein each of said blades includes at least one elongated aperture for accommodating one of said pins.

5. The rasp hub assembly of claim 1, wherein each of said blades in any one of said plurality of rows is positioned in end-to-end relation with adjacent blades in said one row.

6. The rasp hub assembly of claim 1, wherein both the blades and the spacers are symmetrical.

7. The rasp hub assembly of claim 1, wherein each said blade has a sweep distance.

8. The rasp hub assembly of claim 1, wherein each of the blades and the spacers has an angled intermediate portion and generally planar end portions extending from said intermediate portion, said planar end portions intersecting to form a vertex.

9. The rasp hub assembly of claim 1, wherein each of the blades and the spacers has a curved intermediate portion and generally planar end portions extending from said intermediate portion.

10. The rasp hub assembly of claim 2, wherein the angle defined by the flats of said blades and spacers and an axial plane of the hub is between about 4° and 12°.

11. The rasp hub assembly of claim 2, wherein the angle defined by the flats, said blades and spacers and an axial plane of the hub is about 8°.

12. The rasp hub assembly of claim 1, wherein each of said blades include teeth all of which extend in a direction generally parallel to the direction of hub rotation.

13. A rotating rasp hub assembly for use in a tire buffing machine, comprising:

a plurality of rasp blades and spacers disposed between a pair of end plates and arranged in alternating juxtaposed circumferential rows, wherein each of said rows of blades includes a plurality of blades and each of said rows of spacers includes a plurality of spacers;

each of said blades and said spacers having a nonplanar elongated body including two planar flats, and each of the bodies of the blades and the spacers having opposing symmetrical, nonplanar surfaces, thereby increasing overall hub stability and facilitating positioning of the blades during assembly;

said end plates having a plurality of opposed axially facing inclined surfaces, at least one of said end plates including a plurality of pins extending between said end plates and arranged circumferentially about the hub assembly such that no more than one of said pins intersects each of said blade and spacer flats in each of said circumferential rows; and wherein an odd number of rasp blades is used in each of said circumferential rows.

14. The rasp hub assembly of claim 13, wherein each of said rasp blades has an angled intermediate portion and first and second generally planar end portions extending from an intermediate portion, said planar end portions intersecting to form a vertex; and each of said first and second planar end portions includes teeth which are angularly set to be positioned generally parallel to the direction of hub rotation.

15. A rotating rasp hub assembly for use in a tire buffing machine, comprising:

a plurality of rasp blades and spacers disposed between a pair of end plates and arranged in alternating juxtaposed circumferential rows, said blades and spacers extending end-to-end within their respective rows, wherein each of said rows of blades includes at least two blades and each of said rows of spacers includes at least two spacers;

each of said blades and said spacers having a nonplanar elongated body including at least two planar flats, each of the bodies of the blades and the spacers having opposing symmetrical, nonplanar surfaces and thereby increasing overall hub stability and facilitating positioning of the blades during assembly; and said end plates having a plurality of opposed axially facing inclined surfaces, at least one of said end plates including a plurality of pins extending between said end plates and arranged circumferentially about the hub assembly such that no more than one of said pins intersects each said blade and spacer flat within each said circumferential row.

16. The rotating rasp hub assembly of claim 15, wherein both ends of each said blade within any one of said first plurality of rows are positioned on a common axial plane of the hub.

17. The rotating rasp hub assembly of claim 15, wherein each of said blades include teeth all of which extend in a direction generally parallel to the direction of hub rotation.

18. The rotating rasp hub assembly of claim 15, wherein the hub assembly has a sweep-to-pin ratio of 1.

19. The rasp hub assembly of claim 15, wherein each of said rows of blades includes at least four blades, and each of said rows of spacers includes at least four spacers, whereby each said circumferential row of blades performs at least eight alternating sweeps during one hub revolution.

* * * * *

UNITED STATES PATENT AND TRADEMARK OFFICE
CERTIFICATE OF CORRECTION

PATENT NO. : 5,504,981
DATED : APRIL 9, 1996
INVENTOR(S) : JENSEN ET AL

It is certified that error appears in the above-identified patent and that said Letters Patent is hereby corrected as shown below:

In the claims, column 8, line 19, after "distance", insert -- "equal to or greater than the width of each said spacer"--

Signed and Sealed this

Sixteenth Day of July, 1996

Attest:

BRUCE LEHMAN

*Attesting Officer*          *Commissioner of Patents and Trademarks*

UNITED STATES PATENT AND TRADEMARK OFFICE
CERTIFICATE OF CORRECTION

PATENT NO. : 5,504,981

DATED : APRIL 9, 1996

INVENTOR(S) : WAYNE JENSEN, CHARLES K. STANFIELD

It is certified that error appears in the above-identified patent and that said Letters Patent are hereby corrected as shown below: Title page,
ITEM 56, "REFERENCES CITED" SHOULD INCLUDE --"4,012,819   3/22/77   WILLINGER"--

Signed and Sealed this

Seventeenth Day of December, 1996

Attest:

BRUCE LEHMAN

Attesting Officer        Commissioner of Patents and Trademarks